United States Patent
Okuda et al.

(10) Patent No.: US 9,039,128 B2
(45) Date of Patent: May 26, 2015

(54) APPARATUS FOR AND METHOD OF RECORDING IMAGE

(71) Applicant: DAINIPPON SCREEN MFG. CO., LTD., Kyoto-shi, Kyoto (JP)

(72) Inventors: Kuniharu Okuda, Kyoto (JP); Keiji Hatano, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 14/322,719

(22) Filed: Jul. 2, 2014

(65) Prior Publication Data

US 2015/0022573 A1 Jan. 22, 2015

(30) Foreign Application Priority Data

Jul. 5, 2013 (JP) .................................. 2013-141956

(51) Int. Cl.
B41J 29/393 (2006.01)
B41J 2/045 (2006.01)

(52) U.S. Cl.
CPC .................................. B41J 2/04595 (2013.01)

(58) Field of Classification Search
None
See application file for complete search history.

(56) References Cited

U.S. PATENT DOCUMENTS

| 5,581,284 | A | * | 12/1996 | Hermanson | 347/43 |
| 7,207,647 | B2 | * | 4/2007 | Silverbrook | 347/19 |
| 7,762,643 | B2 | * | 7/2010 | Sakai | 347/19 |
| 7,871,149 | B2 | | 1/2011 | Chikamoto et al. | |
| 2013/0076823 | A1 | | 3/2013 | Nomura et al. | |

FOREIGN PATENT DOCUMENTS

| JP | 6-152902 A | 5/1994 |
| JP | 2008-221547 A | 9/2008 |
| JP | 2013-71289 A | 4/2013 |

* cited by examiner

Primary Examiner — Lamson Nguyen
(74) Attorney, Agent, or Firm — McDermott Will & Emery LLP (57) ABSTRACT

An image recording apparatus includes a plurality of recording heads arranged in a staggered configuration in a width direction. Adjacent ones of the recording heads have respective adjacent nozzles for ejecting ink droplets onto positions adjacent to each other in the width direction on a recording medium. For recording an image, a correction area rate less than a dot area rate of an input mage in a recording position of each of the adjacent nozzles is calculated from the dot area rate. Then, ink droplets are ejected from each of the adjacent nozzles in accordance with the correction area rate. As a result, the amounts of ink droplets ejected from the adjacent nozzles are limited. For a recording process using a head unit including the recording heads arranged in a staggered configuration, this suppresses the occurrence of unevenness in density due to an undesirable flow or bleeding of ink at the boundary between recording regions of the recording heads.

10 Claims, 7 Drawing Sheets

| CORRECTION POSITION | 1-2 | 2-3 | 3-4 | 4-5 | |
|---|---|---|---|---|---|
| 5% | 80 | 80 | 80 | 80 | |
| 10% | 80 | 80 | 80 | 80 | |
| 20% | 80 | 80 | 80 | 80 | |
| 30% | 80 | 80 | 80 | 80 | |
| 40% | 80 | 80 | 80 | 80 | |
| 50% | 80 | 80 | 80 | 80 | |
| 60% | 70 | 70 | 70 | 70 | |
| 70% | 50 | 50 | 50 | 50 | |
| 80% | 30 | 30 | 30 | 30 | |
| 90% | 0 | 0 | 0 | 0 | |

T

DOT AREA RATE

FIG.7

APPARATUS FOR AND METHOD OF RECORDING IMAGE

CROSS-REFERENCE TO RELATED APPLICATIONS

The subject application claims priority to Japanese Patent Application No. 2013-141956 filed Jul. 5, 2013, the disclosure of which is incorporated herein by reference in entirety.

BACKGROUND OF THE INVENTION

1. Field of the Invention

The present invention relates to an image recording apparatus and an image recording method which record an image by ejecting ink droplets onto a sheet-like recording medium.

2. Description of the Background Art

A line head inkjet printer which records an image on printing paper by ejecting ink droplets from a plurality of nozzles arranged in a direction perpendicular to the transport direction of the printing paper while transporting the printing paper has been hitherto known. In the line head inkjet printer, it is necessary that the nozzles are arranged along substantially the full width of the printing paper. However, the use of a single elongated recording head requires the repair or replacement of the whole recording head in the event of a failure of one or some of the nozzles in the recording head. This is disadvantageous in production efficiency and in costs.

To solve such a problem, a head unit including a plurality of recording heads arranged in a staggered configuration along the width of printing paper has been hitherto used (as disclosed, for example, in Japanese Patent Application Laid-Open No. 2008-221547). The use of such a head unit requires the repair or replacement of only a failed recording head in the event of the failure of the recording head. This enhances the production efficiency and suppresses costs required for the repair and the like. However, the use of the plurality of recording heads gives rise to another problem in that unevenness in density is prone to result at a joint between adjacent ones of the recording heads.

Shading compensation has been hitherto known as a technique for suppressing unevenness in density at a joint between adjacent recording heads. The shading compensation is a technique which includes the steps of: reading a printed image with a scanner; converting the brightness values of the read image into print density values to produce a compensation table; and controlling the amount of ink ejected from the nozzles, based on the compensation table (as disclosed, for example, in Japanese Patent Application Laid-Open No. 2013-71289).

In an inkjet printer, there are cases where an undesirable flow and bleeding of ink occur pronouncedly depending on the type of printing medium and the type of ink. In such cases, unevenness in density sometimes occurs in a position deviated from a nozzle causative of the unevenness in density, rather than immediately under the causative nozzle. It is difficult for the shading compensation made in these cases to appropriately correct the causative nozzle because the position of the causative nozzle is different from the position where the unevenness in density occurs. Thus, there is a need for a technique capable of suppressing the unevenness in density as well as coping with an undesirable flow and bleeding of ink.

A technique which copes with an undesirable flow and bleeding of ink is disclosed, for example, in Japanese Patent Application Laid-Open No. 6-152902 (1994). To suppress the bleeding of ink between black ink and other-than-black color ink, the technique disclosed in Japanese Patent Application Laid-Open No. 6-152902 (1994) shows that black pixels and other-than-black color pixels which are positioned at the boundary between a black image portion and an other-than-black color image portion are recorded so that every other dot is skipped.

However, there has not yet been proposed any technique which copes with an undesirable flow and bleeding of ink between recording heads in a head unit including the recording heads arranged in a staggered configuration.

SUMMARY OF THE INVENTION

In view of the foregoing, it is an object of the present invention to provide a technique capable of suppressing the occurrence of unevenness in density at the boundary between recording regions of recording heads in consideration for an undesirable flow and bleeding of ink in a head unit including the recording heads arranged in a staggered configuration.

A first aspect of the present invention is intended for an image recording apparatus for recording an image by ejecting ink droplets onto a sheet-like recording medium. The image recording apparatus comprises: a transport mechanism for transporting the recording medium along a transport path; a head unit for ejecting ink droplets toward the recording medium transported by the transport mechanism; and a controller for controlling the transport mechanism and the head unit, the head unit being structured to include a plurality of recording heads each having a plurality of nozzles arranged in a width direction orthogonal to the transport path, the recording heads being arranged in a staggered configuration in the width direction, the recording heads in the head unit including adjacent recording heads having respective adjacent nozzles for ejecting ink droplets onto positions adjacent to each other in the width direction on the recording medium, the controller causing each of the adjacent nozzles to eject ink droplets in accordance with a correction area rate less than a dot area rate of an input image in a recording position of each of the adjacent nozzles.

A second aspect of the present invention is intended for a method of recording an image by ejecting ink droplets from a head unit toward a sheet-like recording medium while transporting the recording medium along a transport path, the head unit including a plurality of recording heads arranged in a staggered configuration in a width direction orthogonal to the transport path, each of the recording heads having a plurality of nozzles arranged in the width direction, the recording heads in the head unit including adjacent recording heads having respective adjacent nozzles for ejecting ink droplets onto positions adjacent to each other in the width direction on the recording medium. The method comprises the steps of: a) calculating a correction area rate from a dot area rate of an input image in a recording position of each of the adjacent nozzles, the correction area rate being less than the dot area rate; and b) ejecting ink droplets in amounts depending on the correction area rate from each of the adjacent nozzles, the step b) being performed after the step a).

According to the first and second aspects of the present invention, the amounts of ink droplets ejected from the adjacent nozzles are limited. This suppresses the occurrence of unevenness in density due to an undesirable flow or bleeding of ink at the boundary between recording regions of the recording heads. In addition, the adjacent nozzles are subjected to the correction for the limitation of the amounts of ink droplets ejected therefrom. This prevents erroneous selection of the nozzles subjected to the correction.

These and other objects, features, aspects and advantages of the present invention will become more apparent from the following detailed description of the present invention when taken in conjunction with the accompanying drawings.

DESCRIPTION OF THE PREFERRED EMBODIMENTS

One preferred embodiment according to the present invention will now be described with reference to the drawings. A direction in which printing paper 9 is transported is referred to as a "transport direction", and a horizontal direction orthogonal to the transport direction is referred to as a "width direction" hereinafter.

<1. Configuration of Image Recording Apparatus>

Figure 1:
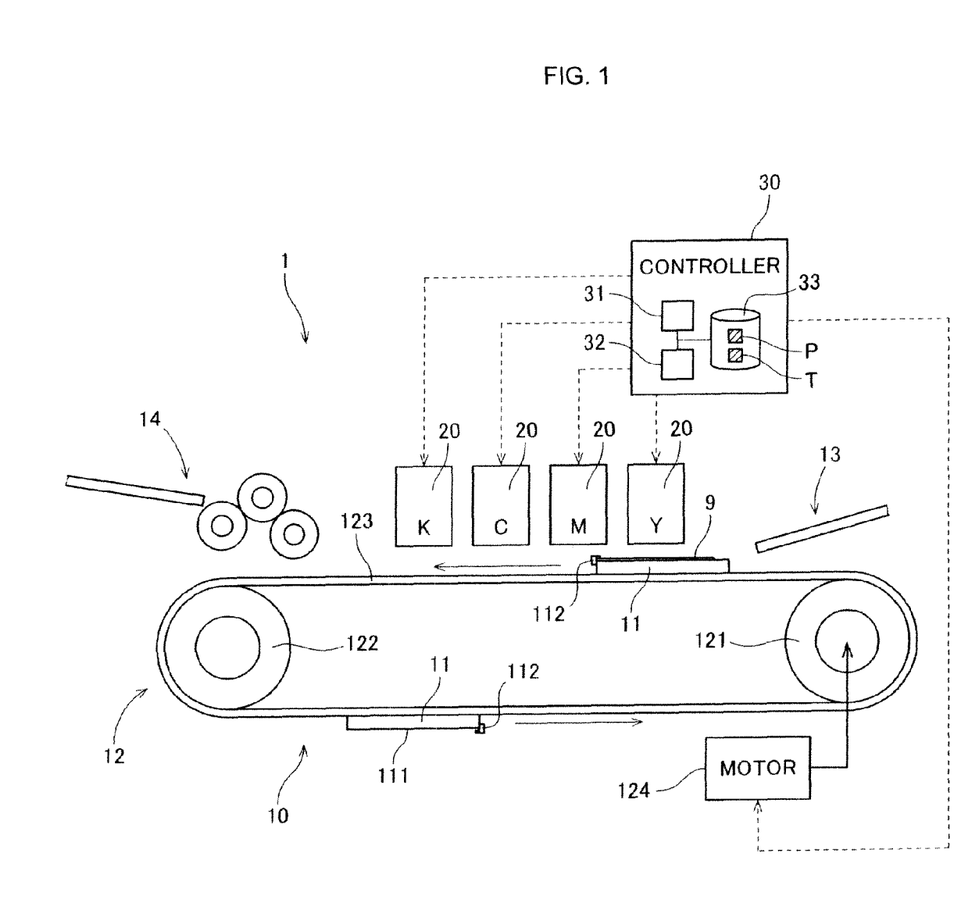
FIG. 1 is a schematic view of an image recording apparatus.

FIG. 1 is a schematic view of an image recording apparatus 1 according to the one preferred embodiment of the present invention. This image recording apparatus 1 is an apparatus for recording a color image on the printing paper 9 which is a recording medium in sheet form, based on inkjet technology. As shown in FIG. 1, the image recording apparatus 1 includes a transport mechanism 10, four head units 20, and a controller 30.

The transport mechanism 10 is a mechanism for transporting the printing paper 9 along a transport path. The transport mechanism 10 includes a plurality of holding tables 11, and a table driver 12.

Each of the holding tables 11 has a flat holding surface 111 which holds the printing paper 9 thereon by suction. The holding surface 111 has a plurality of suction holes (not shown) formed therein for attaching the printing paper 9 to the holding surface 111 by negative pressure suction. A pair of fixtures 112 for fixing the leading edge of the printing paper 9 are provided on the downstream edge of each of the holding tables 11. The printing paper 9 is supplied from a paper feed part 13, and placed on the holding surface 111 of one of the holding tables 11. The leading edge of the printing paper 9 is fixed under pressure to the pair of fixtures 112. The printing paper 9 is attached to the holding surface 111 by negative pressure produced in the suction holes. After printing, the attachment of the printing paper 9 to the holding surface 111 by means of the suction holes and the pressure applied to the printing paper 9 by the fixtures 112 are released, and the printing paper 9 is outputted to a paper output part 14.

The table driver 12 includes a drive roller 121, a follower roller 122, and a belt 123 in the form of a loop. The belt 123 in the form of a loop is looped around and mounted on these rollers 121 and 122. The holding tables 11 are mounted to portions of the belt 123. As schematically shown in FIG. 1, the drive roller 121 is coupled to a motor 124 serving as a power source.

When the motor 124 is driven, the drive roller 121 is rotated, so that the belt 123 and the holding tables 11 accordingly run around the drive roller 121 and the follower roller 122. Each of the holding tables 11 which holds the printing paper 9 thereon is transported under the four head units 20 along the transport path directed from the paper feed part 13 toward the paper output part 14.

The four head units 20 are arranged in spaced apart relation in the transport direction over the transport path of the printing paper 9. The four head units 20 eject ink droplets of yellow (Y), magenta (M), cyan (C) and black (K), respectively, onto the upper surface of the printing paper 9. The structure of only one of the head units 20 will be described below, because the four head units 20 have substantially the same structure.

Figure 2:
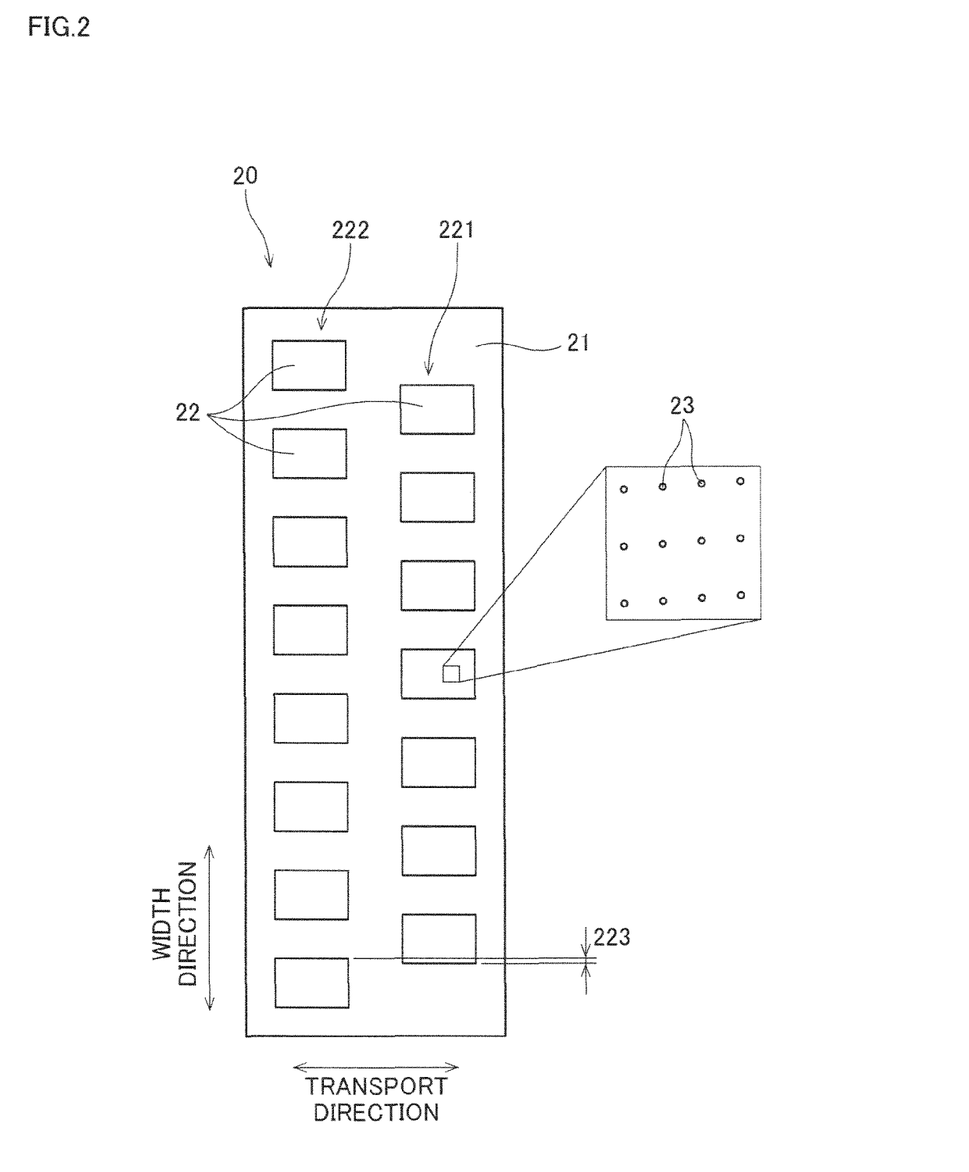
FIG. 2 is a bottom plan view of a head unit.

FIG. 2 is a bottom plan view of one head unit 20. The head unit 20 includes a housing 21, and a plurality of recording heads 22 fixed to the housing 21. Each of the recording heads 22 has an exposed ejection surface at the lower surface of the housing 21. As shown in FIG. 2, the recording heads 22 are arranged in a staggered configuration (in obliquely alternating positions) in the width direction. Specifically, the recording heads 22 includes a first row 221 of recording heads arranged in the width direction, and a second row 222 of recording heads arranged in the width direction, the second row 222 being downstream of the first row 221. The recording heads 22 in the first row 221 and the recording heads 22 in the second row 222 are arranged alternately as seen in the width direction. The recording heads 22 are disposed at a high density in the width direction because of such an arrangement of the recording heads 22 in a staggered configuration.

Each of the recording heads 22 has a plurality of nozzles 23 which ejects ink droplets. As shown on an enlarged scale in FIG. 2, the nozzles 23 are disposed in a two-dimensional array in the ejection surface of each of the recording heads 22. It should be noted that the positions of the individual nozzles 23 are shifted in the width direction, and each of the nozzles 23 is assigned to a region having a width of one pixel on the printing paper 9.

When the image recording apparatus 1 is in operation, ink droplets are ejected from the nozzles 23 onto the upper surface of printing paper 9 in accordance with image data D (with reference to FIG. 5) while the printing paper 9 is transported by the transport mechanism 10. As mentioned above, the recording heads 22 each having the nozzles 23 are arranged in a staggered configuration in the width direction in each of the head units 20. This allows each of the head units 20 to eject ink droplets across almost the full width of the upper surface of the printing paper 9. The four head units 20 sequentially perform such a process of ejecting ink droplets to form a color image on the upper surface of the printing paper 9.

The controller 30 is a section for controlling the operations of the parts of the image recording apparatus 1. As schematically shown in FIG. 1, the controller 30 according to the present preferred embodiment includes a computer having an arithmetic processor 31 such as a CPU, a memory 32 such as a RAM, and a storage part 33 such as a hard disk drive. The controller 30 is electrically connected to the aforementioned motor 124 and the four head units 20. The controller 30 temporarily reads a computer program P and table data T to be described later which are stored in the storage part 33 onto the memory 32. The arithmetic processor 31 performs arithmetic processing based on the computer program P and the table data T, so that the controller 30 controls the operations of the motor 124 and the four head units 20. Thus, a printing process in the image recording apparatus 1 proceeds.

<2. Adjacent Nozzles>

As shown in FIG. 2, adjacent ones of the recording heads 22 in each of the head units 20 have an overlap 223 where the adjacent recording heads 22 overlap each other in the width direction. In the overlap 223, the nozzles 23 in one of the adjacent recording heads 22 and the nozzles 23 in the other of the adjacent recording heads 22 are arranged in the same widthwise positions.

Figure 3:
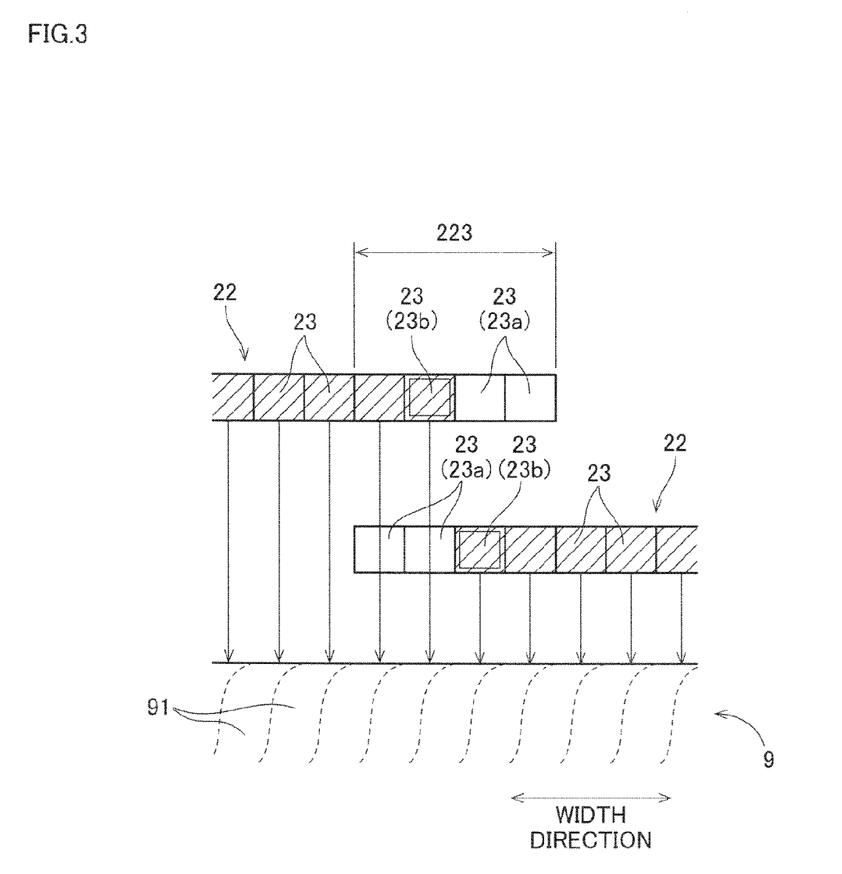
FIG. 3 is a view schematically showing a plurality of nozzles near an overlap.

FIG. 3 is a view schematically showing the nozzles 23 near the overlap 223. Although the nozzles 23 are disposed in a two-dimensional array as mentioned above, the nozzles 23 in each of the recording heads 22 are shown as disposed in a line in the width direction for ease of understanding in FIG. 3. Each of the nozzles 23 is capable of ejecting ink droplets onto a strip-shaped region 91 having a width of one pixel on the printing paper 9. It should be noted that a few nozzles 23 at an edge of each recording head 22 are spare nozzles 23a which do not eject ink droplets, as shown in FIG. 3. Thus, the nozzles 23 (shaded nozzles in FIG. 3) other than the spare nozzles 23a in each recording head 22 eject ink droplets onto the strip-shaped regions 91 of the printing paper 9.

The nozzles 23 positioned next to the spare nozzles 23a (the nozzles 23 positioned at the extreme edges among the nozzles which eject ink droplets) are highlighted by edging in FIG. 3. Such nozzles 23 are referred to as "adjacent nozzles 23b" hereinafter. In the overlap 223, the adjacent nozzle 23b in one of the recording heads 22 and the adjacent nozzle 23b in the other recording head 22 are disposed in adjacent positions as seen in the width direction. In other words, these adjacent nozzles 23b eject ink droplets onto adjacent strip-shaped regions 91 of the printing paper 9.

When the image recording apparatus 1 is in operation, the image data D (with reference to FIG. 5) to be printed is inputted to the controller 30. A dot area rate R1 is set for each unit area in the image data D. The nozzles 23 other than the spare and adjacent nozzles 23a and 23b eject ink droplets in amounts depending on the dot area rate R1 read from the image data D. Specifically, the nozzles 23 other than the spare and adjacent nozzles 23a and 23b eject ink droplets onto the printing paper 9 while changing the amounts of ejected ink droplets (for example, three levels of the amounts of ejected ink droplets: S, M and L) and the number of ink droplets ejected per unit length in accordance with the dot area rate R1. Thus, light and shade or density levels of an image are represented on the printing paper 9.

Figure 4:
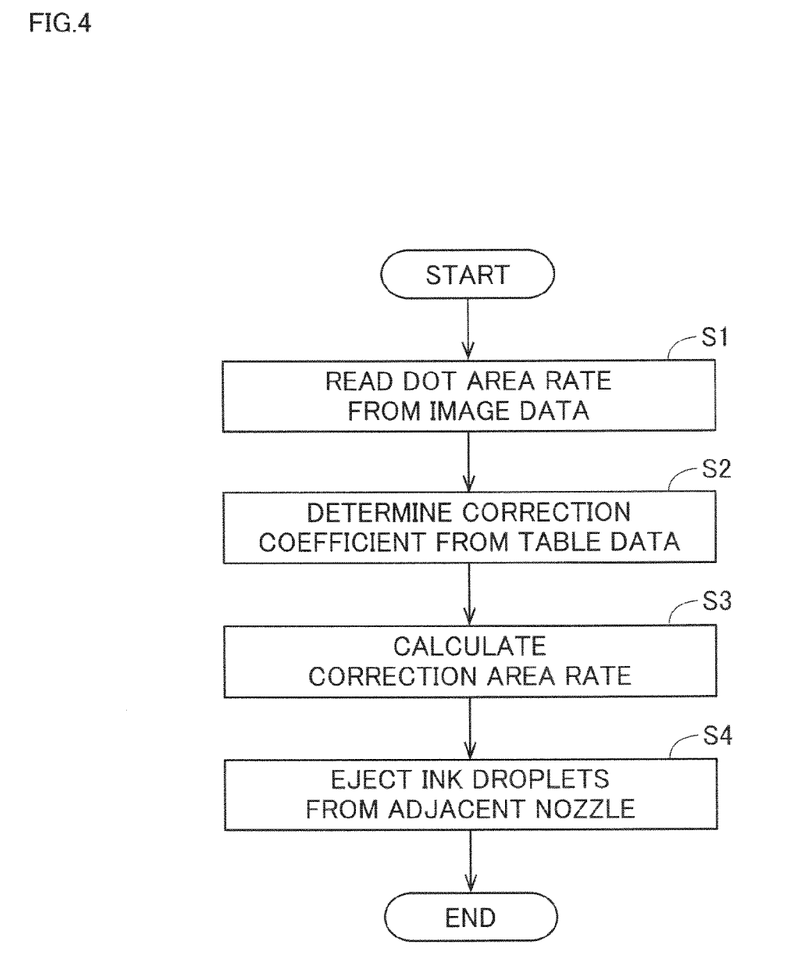
FIG. 4 is a flow diagram showing a procedure for the process of ejecting ink droplets from an adjacent nozzle.
Figure 5:
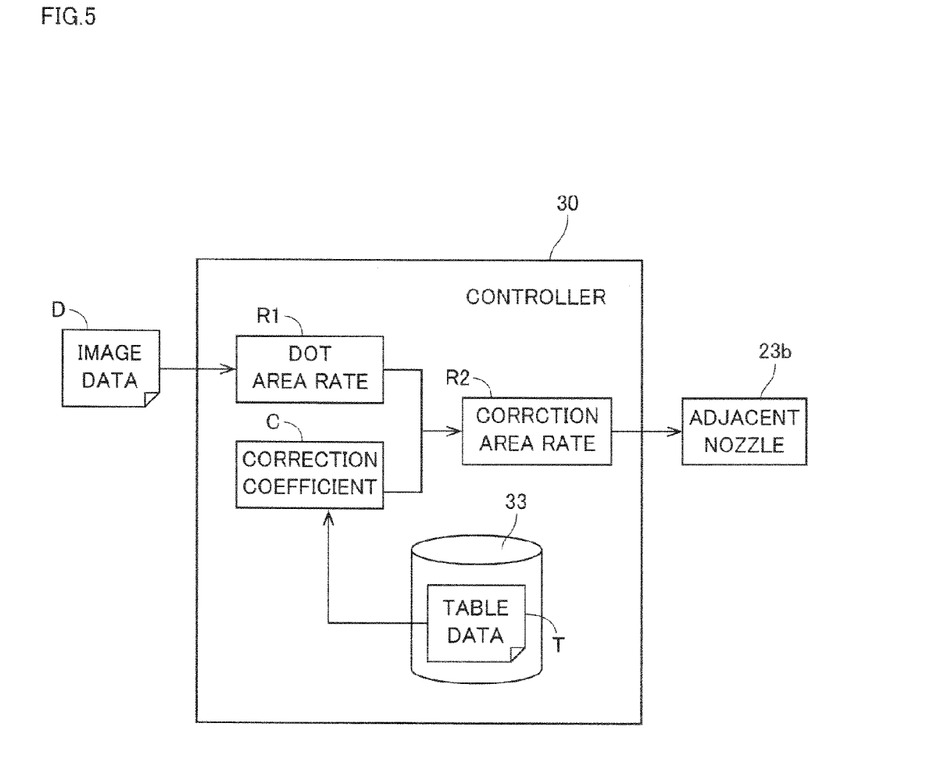
FIG. 5 is a block diagram schematically showing data processing related to the process of ejecting ink droplets from the adjacent nozzle.

In this image recording apparatus 1, the amounts of ink droplets ejected from the adjacent nozzles 23b are limited for the purpose of suppressing the occurrence of unevenness in density due to an undesirable flow and bleeding of ink in the overlap 223 of the adjacent recording heads 22. The process of ejecting ink droplets from each adjacent nozzle 23b will be described. FIG. 4 is a flow diagram showing a procedure for the process of ejecting ink droplets from an adjacent nozzle 23b. FIG. 5 is a block diagram schematically showing data processing related to the ejecting process.

For the process of ejecting ink droplets from the adjacent nozzle 23b, the dot area rate R1 in the recording position of the adjacent nozzle 23b is initially read from the inputted image data D (in Step S1). Next, the table data T is read from the storage part 33, and a correction coefficient C is determined based on the table data T (in Step S2). Then, a correction area rate R2 is calculated by multiplying the dot area rate R1 by the correction coefficient C (in Step S3).

Figure 6:
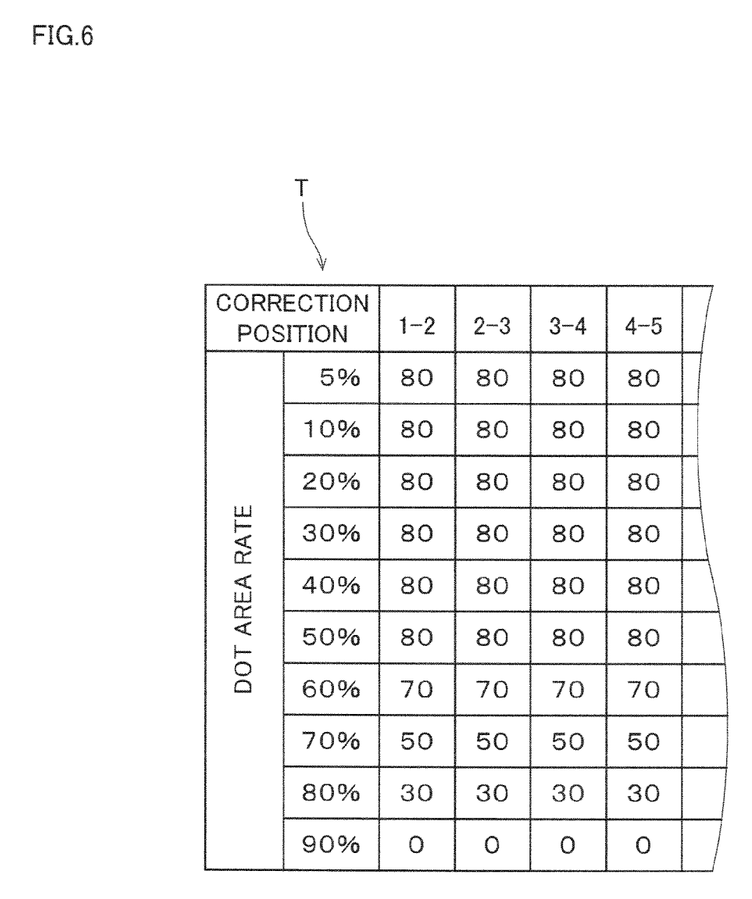
FIGS. 6 and 7 show examples of table data.

FIG. 6 shows an example of the table data T. As shown in FIG. 6, the values of the correction coefficient C corresponding to the values of the dot area rate R1 are previously determined for each adjacent nozzle 23b in the table data T. The "correction position" in the table data T denotes the position of each adjacent nozzle 23b subjected to the correction. For example, "1-2" denotes an adjacent nozzle 23b positioned at the boundary between the first and second recording heads 22 from an end of each head unit 20. The "dot area rate" in the table data T denotes the dot area rate R1 read from the image data D.

In the example of FIG. 6, the correction coefficient C is 50% when the dot area rate read from the image data D is 70%. A correction area rate R2 of 35% is accordingly obtained by multiplying the dot area rate R1 by the correction coefficient C. The correction coefficient C is set so as to remain the same or to decrease as the dot area rate R1 increases. This setting is made to further suppress the amount of ink because the amount of ink which causes an undesirable flow and bleeding is greater in a region having a greater dot area rate R1. Although the correction coefficient C has the same value for all of the adjacent nozzles 23b in the example of FIG. 6, the correction coefficient C may have different values for the respective adjacent nozzles 23b.

After the calculation of the correction area rate R2, the controller 30 controls the adjacent nozzle 23b, based on the correction area rate R2. That is, the controller 30 causes the adjacent nozzle 23b to eject ink droplets in amounts depending on the correction area rate R2 (in Step S4). Specifically, the controller 30 causes the adjacent nozzle 23b to eject ink droplets onto the printing paper 9 while changing the amounts of ejected ink droplets (for example, three levels of the amounts of ejected ink droplets: S, M and L) and the number of ink droplets ejected per unit length in accordance with the correction area rate R2.

As mentioned above, the controller 30 in the image recording apparatus 1 calculates the correction area rate R2 which is less than the dot area rate R1 by multiplying the dot area rate R1 in the image data D by the previously determined correction coefficient C. Then, the process of ejecting ink droplets from the adjacent nozzle 23b is performed based on the correction area rate R2. Thus, the amounts of ink droplets ejected from the adjacent nozzle 23b is limited as compared with the amounts of ink droplets ejected from each of the nozzles 23 other than the spare and adjacent nozzles 23a and 23b. The amount of limited ink is compensated by the spread of ink ejected onto the surrounding pixels because of a flow and bleeding. This suppresses the occurrence of unevenness in density due to an undesirable flow and bleeding of ink at the boundary of the adjacent recording heads 22.

The shading compensation is not performed on the adjacent nozzles 23b, but the amounts of ink droplets ejected from the previously determined adjacent nozzles 23b subjected to the correction is limited. This prevents erroneous selection of the nozzles subjected to the correction.

The susceptibility of the printing paper 9 to an undesirable flow and bleeding of ink differs depending on the type of the printing paper 9 and the type of ink. In the present preferred embodiment, the table data T is rewritably stored in the storage part 33. This enables the correction coefficient C in the table data T to be rewritten depending on the type of the printing paper 9 and the type of ink. Thus, the present preferred embodiment achieves the control of the amounts of ink droplets ejected from the adjacent nozzles 23b by using the table data T optimum for the conditions of use.

The shading compensation may be performed on the nozzles 23 other than the spare and adjacent nozzles 23a and 23b. That is, the amounts of ink droplets ejected from each of the nozzles 23 other than the spare and adjacent nozzles 23a and 23b may be controlled based on an image of a test pattern after the test pattern is printed. It is, however, desirable that, even when the shading compensation is performed, the aforementioned correction using the table data T is performed on the adjacent nozzles 23b and the adjacent nozzles 23b are excluded from the nozzles subjected to the shading compensation.

<3. Modifications>

While the one preferred embodiment according to the present invention has been described hereinabove, the present invention is not limited to the aforementioned preferred embodiment.

Figure 7:
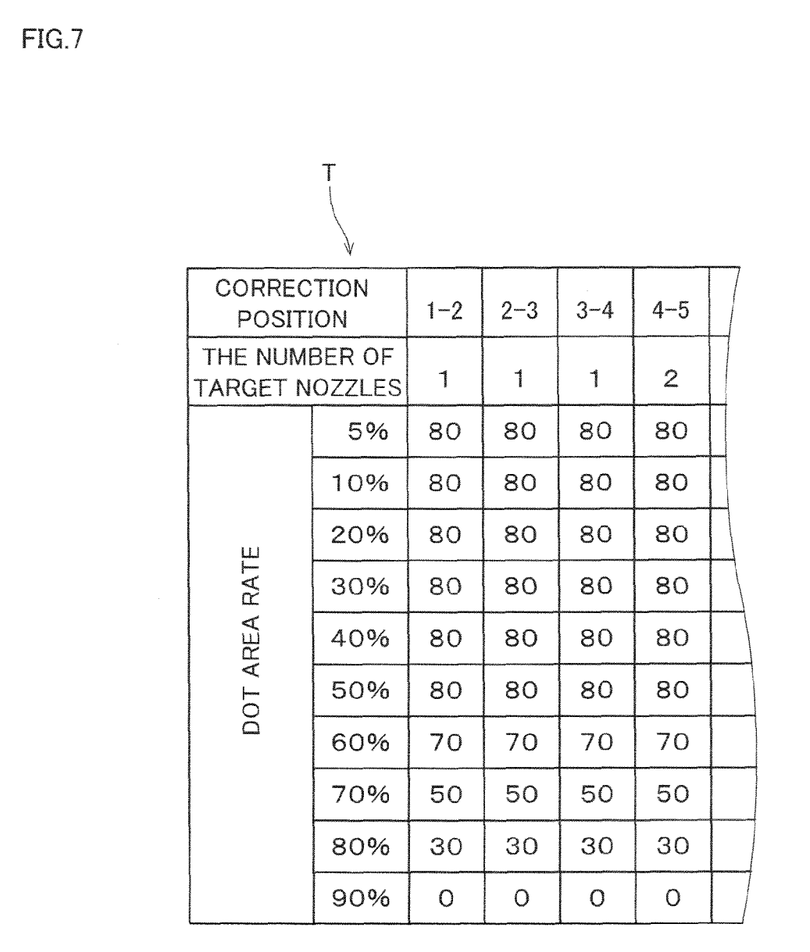

FIG. 7 shows an example of the table data T according to a modification of the present invention. The table data T shown in FIG. 7 includes another item "the number of target nozzles" in addition to the table data T shown in FIG. 6. "The number of target nozzles" denotes the number of nozzles 23 to be controlled as the adjacent nozzles 23b between the recording heads 22. For example, when "the number of target nozzles" is "2", two nozzles positioned next to the spare nozzles 23a (two nozzles positioned at an extreme edge among the nozzles which eject ink droplets) are controlled as the adjacent nozzles 23b. That is, ink droplets are ejected from the two adjacent nozzles 23b, based on the correction area rate R2.

For example, it is desirable that two or more adjacent nozzles 23b are set when the flowability of ink on the printing paper 9 is high so that an undesirable flow and bleeding of ink occur over an area corresponding to two pixels or more. Also, there are cases where the number of nozzles 23 to be set as the adjacent nozzles 23b differs because of slight errors of the mounting position of the recording heads 22 in a single head unit 20. These cases can be coped with by previously specifying "the number of target nozzles" in the table data T as in FIG. 7.

In the aforementioned preferred embodiment, the adjacent nozzles 23b in both of the adjacent recording heads 22 (the adjacent nozzle 23b in one of the adjacent recording heads 22 and the adjacent nozzle 23b in the other thereof) are subjected to the correction. However, the adjacent nozzle 23b in only one of the adjacent recording heads 22 may be subjected to the correction.

In this case, the controller 30 causes the adjacent nozzle 23b in one of the adjacent recording heads 22 to eject ink droplets in accordance with the correction area rate R2. Also, the controller 30 causes the adjacent nozzle 23b in the other of the adjacent recording heads 22 to eject ink droplets in accordance with the dot area rate R1, rather than the correction area rate R2.

In the aforementioned preferred embodiment, the holding tables 11 are used to transport the printing paper 9. However, the transport mechanism according to the present invention may be a transport mechanism which transports the printing paper by other methods. For example, the transport mechanism may transport the printing paper by rotating a plurality of rollers while the printing paper is in contact with the surfaces of the rollers. Also, a plurality of sheets of printing paper 9 are sequentially transported in the aforementioned preferred embodiment. However, the image recording apparatus and the image recording method according to the present invention may be configured such that a strip-shaped sheet of printing paper elongated in the transport direction is paid out from one roller and is wound on the other roller.

The aforementioned image recording apparatus 1 records an image on the printing paper 9 serving as a recording medium. However, the image recording apparatus and the image recording method according to the present invention may be configured to record an image on a sheet-like recording medium other than general paper (for example, a film made of resin and the like).

Also, the aforementioned image recording apparatus 1 is an apparatus for recording a color image by means of the four head units 20. However, the number of head units 20 may be in the range of one to three or not less than five. Also, the image recording apparatus and the image recording method according to the present invention may be those for recording a monochrome image.

The components described in the aforementioned preferred embodiment and in the modifications may be consistently combined together, as appropriate.

While the invention has been described in detail, the foregoing description is in all aspects illustrative and not restrictive. It is understood that numerous other modifications and variations can be devised without departing from the scope of the invention.

What is claimed is:

1. An image recording apparatus for recording an image by ejecting ink droplets onto a sheet-like recording medium, comprising:
   a transport mechanism for transporting said recording medium along a transport path;
   a head unit for ejecting ink droplets toward said recording medium transported by said transport mechanism; and
   a controller for controlling said transport mechanism and said head unit,
   said head unit being structured to include a plurality of recording heads each having a plurality of nozzles arranged in a width direction orthogonal to said transport path, said recording heads being arranged in a staggered configuration in said width direction,
   said recording heads in said head unit including adjacent recording heads having respective adjacent nozzles for ejecting ink droplets onto positions adjacent to each other in said width direction on said recording medium,
   said controller causing each of said adjacent nozzles to eject ink droplets in accordance with a correction area rate less than a dot area rate of an input image in a recording position of each of said adjacent nozzles.

2. The image recording apparatus according to claim 1, wherein
   said controller calculates said correction area rate by multiplying the dot area rate of the input age in the recording position of each of said adjacent nozzles by a previously determined correction coefficient, and
   said correction coefficient remains the same or decreases as said dot area rate increases.

3. The image recording apparatus according to claim 2, wherein
   said controller includes
   a storage part for rewritably storing therein table data in which values of said correction coefficient corresponding to values of said dot area rate are determined for each of said adjacent nozzles.

4. The image recording apparatus according to claim 3, wherein
   said table data further specifies the number of nozzles to be controlled as said adjacent nozzles between the recording heads.

5. The image recording apparatus according to claim 1, wherein
   said controller causes the adjacent nozzle of one of said adjacent recording heads to eject ink droplets in accordance with said correction area rate, and
   said controller causes the adjacent nozzle of the other of said adjacent recording heads to eject ink droplets in accordance with said dot area rate.

6. A method of recording an image by ejecting ink droplets from a head unit toward a sheet-like recording medium while transporting said recording medium along a transport path, said head unit including a plurality of recording heads arranged in a staggered configuration in a width direction orthogonal to said transport path, each of said recording heads having a plurality of nozzles arranged in said width direction, said recording heads in said head unit including adjacent recording heads having respective adjacent nozzles for ejecting ink droplets onto positions adjacent to each other in said width direction on said recording medium, said method comprising the steps of:
- a) calculating a correction area rate from a dot area rate of an input image in a recording position of each of said adjacent nozzles, said correction area rate being less than said dot area rate; and
- b) ejecting ink droplets in amounts depending on said correction area rate from each of said adjacent nozzles, said step b) being performed after said step a).

7. The method according to claim 6, wherein
said correction area rate is calculated in said step a) by multiplying the dot area rate of the input image in the recording position of each of said adjacent nozzles by a previously determined correction coefficient, and said correction coefficient is set so as to remain the same or to decrease as said dot area rate increases.

8. The method according to claim 7, further comprising the steps of:
- c) storing table data in which values of said correction coefficient corresponding to values of said dot area rate are determined for each of said adjacent nozzles in a storage part, said step c) being performed before said step a); and
- d) reading said table data from said storage part to determine said correction coefficient for use in said step a), said step d) being performed after said step c) and before said step a).

9. The method according to claim 8, further comprising the step of:
- e) rewriting said table data in said storage part.

10. The method according to claim 9, wherein
said table data further specifies the number of nozzles to be controlled as said adjacent nozzles between the recording heads.

* * * * *